US007123726B2

(12) United States Patent
Tabata et al.

(10) Patent No.: US 7,123,726 B2
(45) Date of Patent: Oct. 17, 2006

(54) CONNECTING CABLE FOR HELMETS

(75) Inventors: Hajime Tabata, Saitama (JP); Yukio Miyamaru, Saitama (JP); Mutsumi Katayama, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 626 days.

(21) Appl. No.: 09/985,890

(22) Filed: Nov. 6, 2001

(65) Prior Publication Data

US 2002/0054686 A1 May 9, 2002

(30) Foreign Application Priority Data

Nov. 6, 2000 (JP) .............................. 2000-337034

(51) Int. Cl.
*H04B 1/00* (2006.01)

(52) U.S. Cl. ........................... 381/86; 381/110; 381/87

(58) Field of Classification Search .................. 381/56, 381/59, 110, 86, 87, 332; 439/38–40
See application file for complete search history.

(56) References Cited

U.S. PATENT DOCUMENTS 4,206,409 A 6/1980 McKinney
5,774,557 A * 6/1998 Slater .......................... 381/56
5,816,825 A * 10/1998 Sekimori et al. ............. 439/39
5,926,925 A * 7/1999 Hicks .......................... 24/303
2002/0176595 A1* 11/2002 Lazzeroni et al. .......... 381/376

FOREIGN PATENT DOCUMENTS

| | | | |
|---|---|---|---|
| CN | 2053382 | U | 2/1990 |
| DE | 1 214 292 | | 4/1966 |
| DE | 25 03 033 | A1 | 7/1976 |
| DE | 25 16 011 | A1 | 10/1976 |
| DE | 36 04 708 | C1 | 1/1990 |
| JP | 9 147978 | A | 6/1997 |
| TW | 0235526 | | 8/1978 |

* cited by examiner

*Primary Examiner*—Brian T. Pendleton
(74) *Attorney, Agent, or Firm*—Birch, Stewart, Kolasch and Birch, LLP

(57) ABSTRACT

A communication system for communicating between two occupants riding on the same vehicle, or between the driver and the fellow passenger. A helmet that each occupant wears is provided with a microphone and a speaker, respectively. The external contacts of microphone and the speaker are exposed toward the outside of the magnet-side socket, which is one of the sockets of the magnet connector. Each cable extending from the communication unit is provided at the tip with a magnetic-body-side socket, which is the other socket of the magnet connector. The helmet and the cable are connected electrically and mechanically via the magnet connector including the magnet-side socket and the magnetic-body-side socket, which constitutes a pair. The communication unit is connected to the magnet-body-side socket for communicating voices in which a relatively large physiological sound cannot be transmitted.

20 Claims, 9 Drawing Sheets

CONNECTING CABLE FOR HELMETS

CROSS-REFERENCES TO RELATED APPLICATIONS

The present invention claims the benefit of Japanese Patent Application No. 2000-337034, filed Nov. 6, 2000, the entirety of which is hereby incorporated by reference.

BACKGROUND OF THE INVENTION

1. Field of the Invention

The present invention relates to a communication system for a helmet that is provided with a handset and a communication unit, and more specifically, to a connecting cable to be connected to the helmet via a magnet connector.

2. Description of Background Art

A communication system for enabling communication between occupants (intercommunication system) in which a speaker, a microphone, and electric contacts thereof are provided on the helmet of each occupant. A communication unit mounted on the vehicle and the helmet of each occupant are connected with a cable for enabling communication between each occupants riding on a straddling type vehicle, such as a widespread use of a motorcycle.

In the intercommunication system developed for so-called motorcycle cops, a one-touch cable for a motorcycle cop's helmet for connecting between the communication unit fixed on the vehicle and the helmet is provided. The one-touch cable connects the communication unit and the helmet electrically and mechanically by connecting a magnetic-body-side socket mounted on the helmet and a magnet-side socket provided at one end of the dedicated cable.

In the related art described above, since the dedicated cable is provided with a magnet-side socket at one end thereof, when it is stored in the pocket or in the bag for carrying, magnetic field lines generated by the magnet may exert a damaging effect on a magnetic card or a magnetic recording medium in the pocket or in the bag.

Accordingly, it is an object of the present invention to solve the problem in the related art described above and to provide a connecting cable for helmets in which to reduce a magnetically damaging effect on the magnetic card or the like, even if it is carried together with the magnetic card, the magnetic recording medium or the like.

SUMMARY OF THE INVENTION

In order to solve the object described above, the present invention is characterized in that a cable for connecting the handset of the helmet and the communication unit comprises a magnetic-body-side socket to be detachably connected to a magnet-side socket of the helmet, which is provided with the magnet-side socket of the magnet connector at one end thereof.

According to the characteristic described above, since a magnet-side socket (i.e., a source for generating magnetic field lines out of a pair of connectors) constituting a magnetic connector is mounted on the helmet, and no source of magnetic field lines exists on the cable, the possibility that magnetically damaging effect is exerted on the magnetic card or the like is reduced, even when the cable is stored and carried in the pocket or in the bag together with the magnetic card.

According to the present invention, in the structure where the helmet and the cable are connected by the magnet connector, the magnet-side socket (i.e., a source of magnetic field lines) is mounted on the helmet, and the magnetic-body-side socket (i.e., a source of magnetic field lines not provided) is mounted to the cable. Therefore, the possibility to exert a magnetically damaging effect on the magnetic card, magnetic recording medium, or the like is reduced, even when the cable is stored and carried in the pocket or in the bag with the magnetic card.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE PREFERRED EMBODIMENTS

Figure 1:
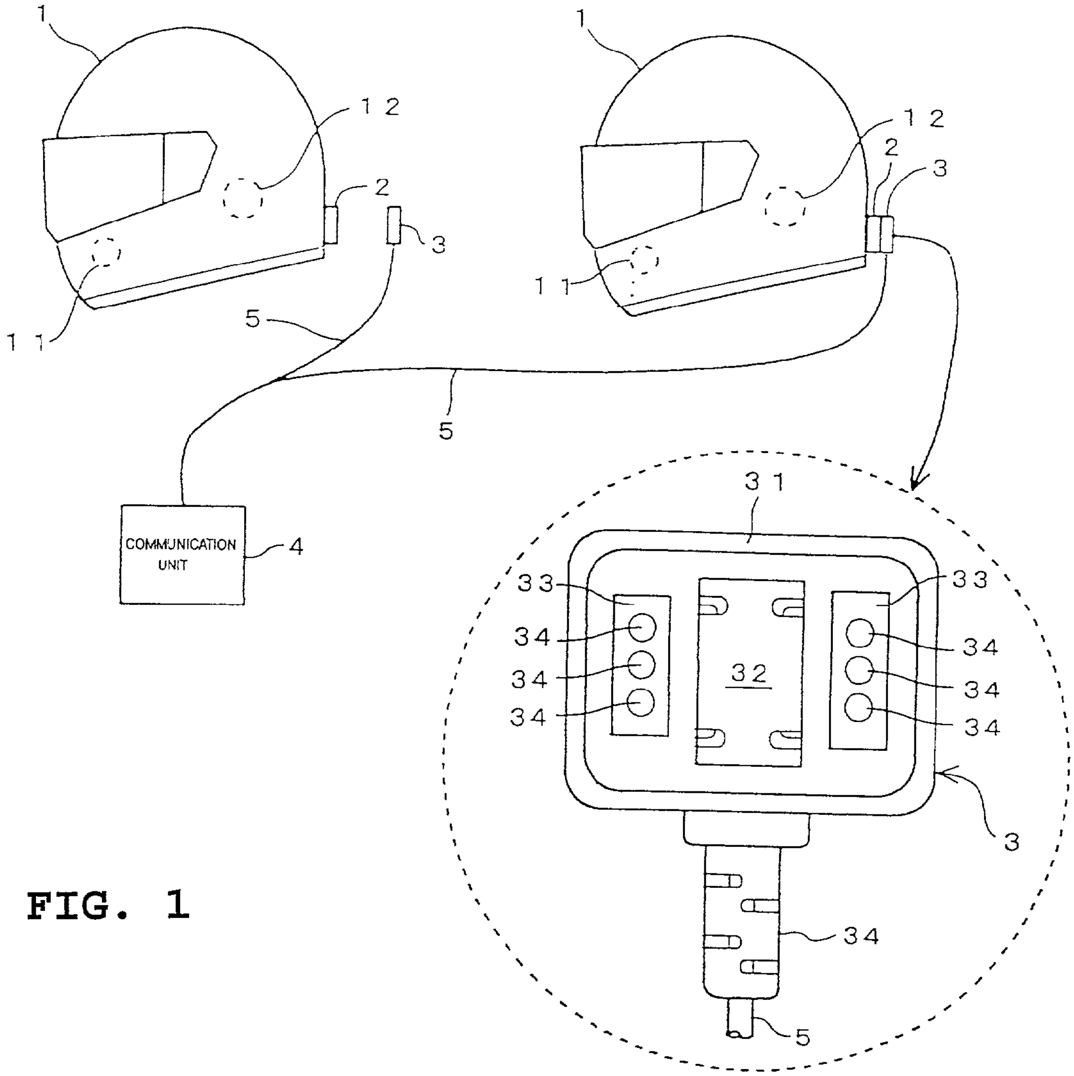
FIG. 1 is a block diagram of a communication system for vehicles to which the present invention is applied.

Referring now to the drawings, the present invention will be described in detail. FIG. 1 is a drawing showing a construction of a communication system for vehicles to which the present invention is applied, whereby communication between two occupants riding on the same vehicle, or between the driver and the fellow passenger, will be described as an example hereinafter.

A helmet 1 that each occupant wears is provided with a microphone 11 and a speaker 12, respectively. The external contacts of the microphone 11 and the speaker 12 are exposed toward the outside at the magnet-side socket 2, which is one of the sockets of the magnet connector. Each cable extending from the communication unit 4 is provided at the tip with a magnetic-body-side socket 3, which is the other socket of the magnet connector. The helmet 1 and the cable 5 are connected electrically and mechanically via the magnet connector including the magnet-side socket 2 and the magnetic-body-side socket 3, which constitutes a pair.

As shown in an enlarged view in the same figure, (i.e., the circle with dotted lines), the connecting surface of the magnetic-body-side socket 3 is formed with an annular rib 31 standing upward along the periphery, a magnetic body plate 32 attached on the bottom portion, and a plurality of electrodes 34 exposed on the upper surface of the island-shaped portion 33 swelling from the bottom portion. However, no source of magnetic field lines is provided. The cable 5 is drawn via a shock-absorbing bush 34.

Figure 2:
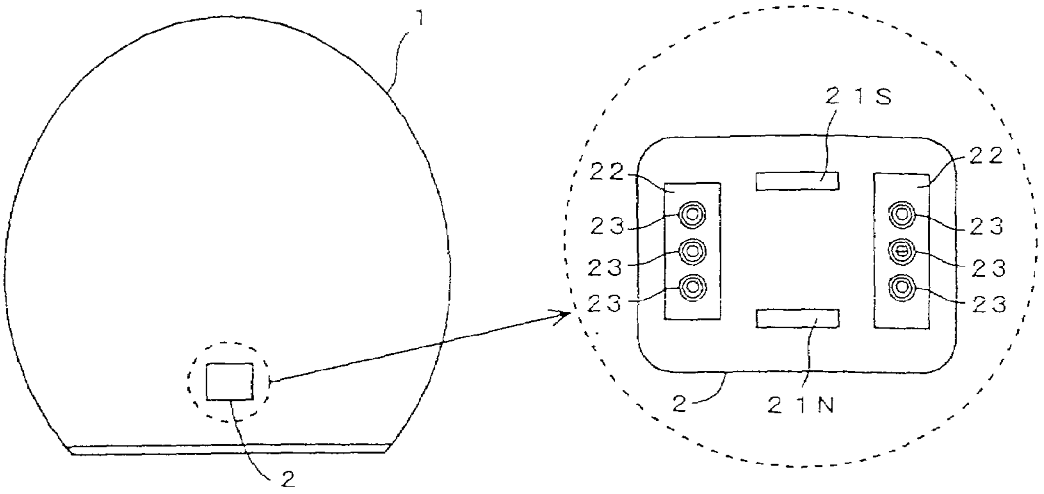
FIG. 2 is a rear view of the helmet.

FIG. 2 is a rear view of the helmet 1 in a state where the magnetic-body-side socket 3 of the cable 5 is not attached, and a connecting surface of the magnet-side socket 2 of the magnet connector is exposed. The connecting surface of the magnet-side socket 2 (as shown in the enlarged view in a dotted circle) on the right-hand side of the same figure is provided with a South pole iron strip 21S and North pole iron strip 21N and a plurality of electrodes 23 exposed on the bottom portion within the recess 22. Accordingly, when they are connected with the magnet-body-side socket 3, the electrodes 23, 34 are brought into contact with each other for establishing electric connection.

The communication unit 4 is detachably fixed to an appropriate position of the vehicle or attached on the body or stored in the dressing of one of the occupants. When the occupant is not riding on the vehicle, he/she may detach the cable from the helmet 1 and wind the cable 5 on the communication unit 4 to carry.

As described above, according to the present invention, the magnet-side socket 2 with a pair of magnet connector for connecting between the helmet 1 and the cable 5 is fixed on the helmet 1, and the magnetic-body-side socket 3 having no source of magnetic field lines is provided at one end of the cable 5. Therefore, even when the cable 5 is detached from the helmet 1, the communication unit 4 which is stored in the pocket or in the bag together with the magnetic card, magnetic disc or the like will not exert adverse influence on the magnetic information.

Figure 3:
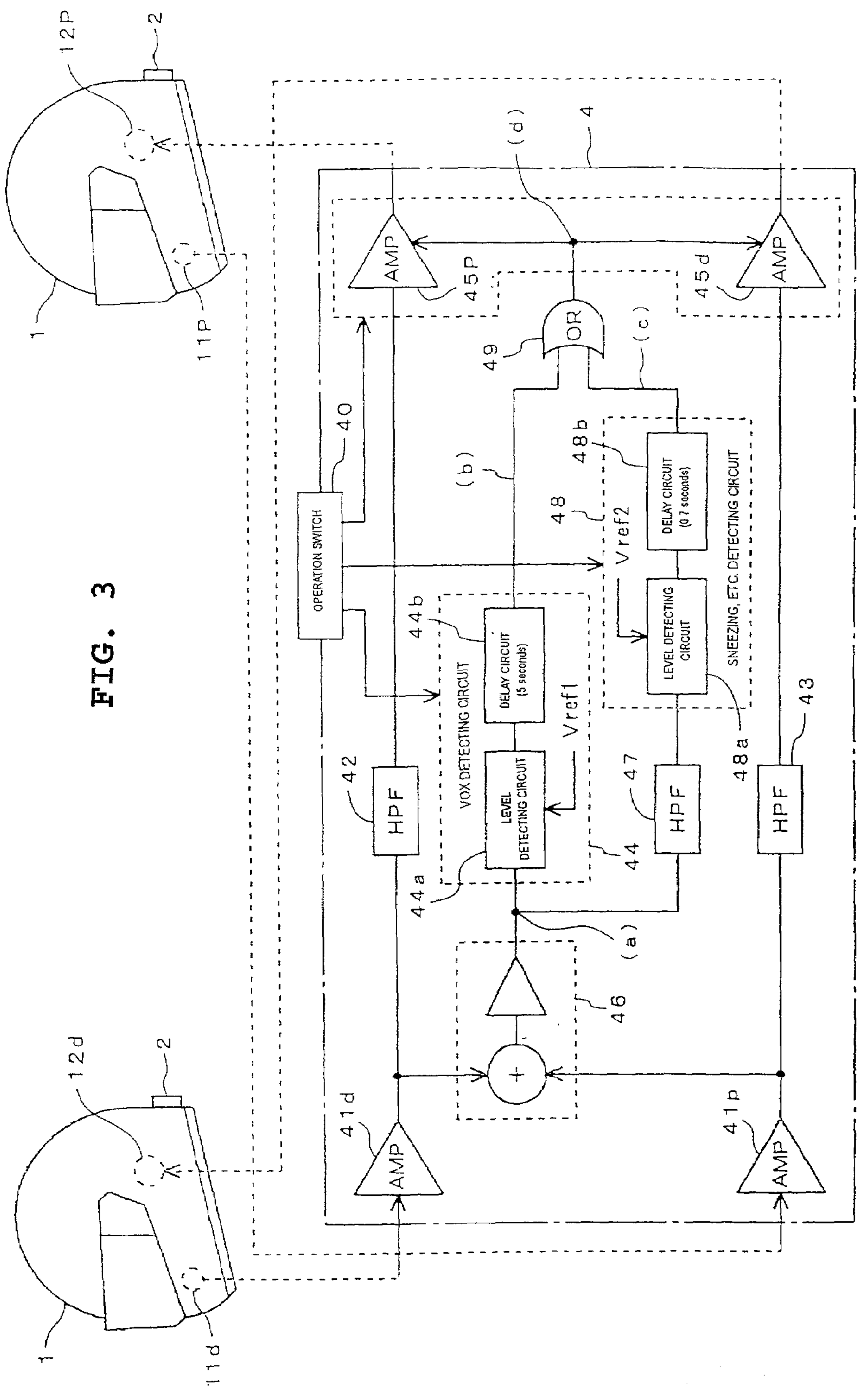
FIG. 3 is a block diagram of the communication unit.

FIG. 3 is a block diagram showing a construction of the principal portion of the communication unit 4, in which the same reference numerals represent the same or corresponding parts. The communication unit 4 of this embodiment is provided with a feature in which a relatively large physiological sound, such as sneezing or coughing is not transmitted to the partner.

The microphone amplifiers 41*d*, 41*p* amplify and output an audio signal detected by the microphones 11*d*, 11*p* mounted on the helmets 1 of the driver and the fellow passenger, respectively. The output signal from the microphone amplifier 41*d* is passed through a highpass filter (HPL) 42 to remove or attenuate components of lower frequency therein and fed to the speaker amplifier 45*p*. In the same way, the output signal from the microphone amplifier 41*p* is passed through the highpass filter 43 to remove or attenuate components of lower frequency and fed to the speaker amplifier 45*d*.

The speaker amplifier 45*p* amplifies the input signal and feeds it to the speaker 12*p* mounted on the helmet 1 of the fellow passenger. The speaker amplifier 45*d* amplifies the input signal and feeds it to the speaker 12*d* mounted on the helmet 1 of the driver. Each speaker amplifier 45*p*, 45*d* is provided with a mute terminal, and when a control signal of "H" level is fed to the mute terminal, it attenuates or shuts down the output signal.

The amplifier provided with a mixer feature (mixer amplifier) 46 synthesizes and amplifies the output signal from the microphone amplifiers 41*d*, 41*p* and outputs it to a VOX detecting circuit 44, and then to a sneezing, etc. detecting circuit 48 via the HPL 47.

The VOX detecting circuit 44 includes a level detecting circuit 44*a* and a delay circuit 44*b* (5 seconds in this embodiment). When the level detecting circuit 44*a* detected a signal higher than the reference value Vref1, it sets the output signal to "L" level, and maintains the level "L" for five seconds, even after the moment when a signal higher than the reference value Vref1 is not detected any more.

The reference value Vref1 is set to the value close to the minimum value of an acoustic signal that is probably detected when the occupants are communicating. Therefore, when the output of the mixer amplifier 46 exceeds the reference value Vref1, it is determined that they are communicating with each other and when it is below the reference value Vref1, it is determined that they are not communicating.

The sneezing, etc. detecting circuit 48 includes a level detecting circuit 48*a* and a delay circuit 48*b* (0.7 seconds in this embodiment). When the level detecting circuit 48*a* detects a signal higher than the reference value Vref2, it sets the output signal to "H" level only for 0.7 seconds. The value 0.7 seconds is a time period that is considered to be a maximum period of time where physiological sound generated by one sneeze or a cough continues. The reference value Vref2 is set to the value close to the minimum value of a signal level that is probably detected when the input signal is generated by physiological sound, such as sneezing or coughing. Therefore, when the output from the mixer amplifier 46 exceeds the reference value Vref2, it is determined that the input signal at this moment is a signal caused by a physiological sound, such as sneezing or coughing.

An OR circuit 49 feeds a logical add of an output signal from the VOX circuit 44 and the output from the sneezing, etc. detecting circuit 48 to the mute terminal of each speaker amplifier 45*p*, 45*d* as a control signal. The operating switch 40 includes a switch for varying the reference values Vref1 and Vref2, the delay time of the delay circuits 44*b*, 48*b*, and the gain of the speaker amplifiers 45*p*, 45*d*.

Figure 4:
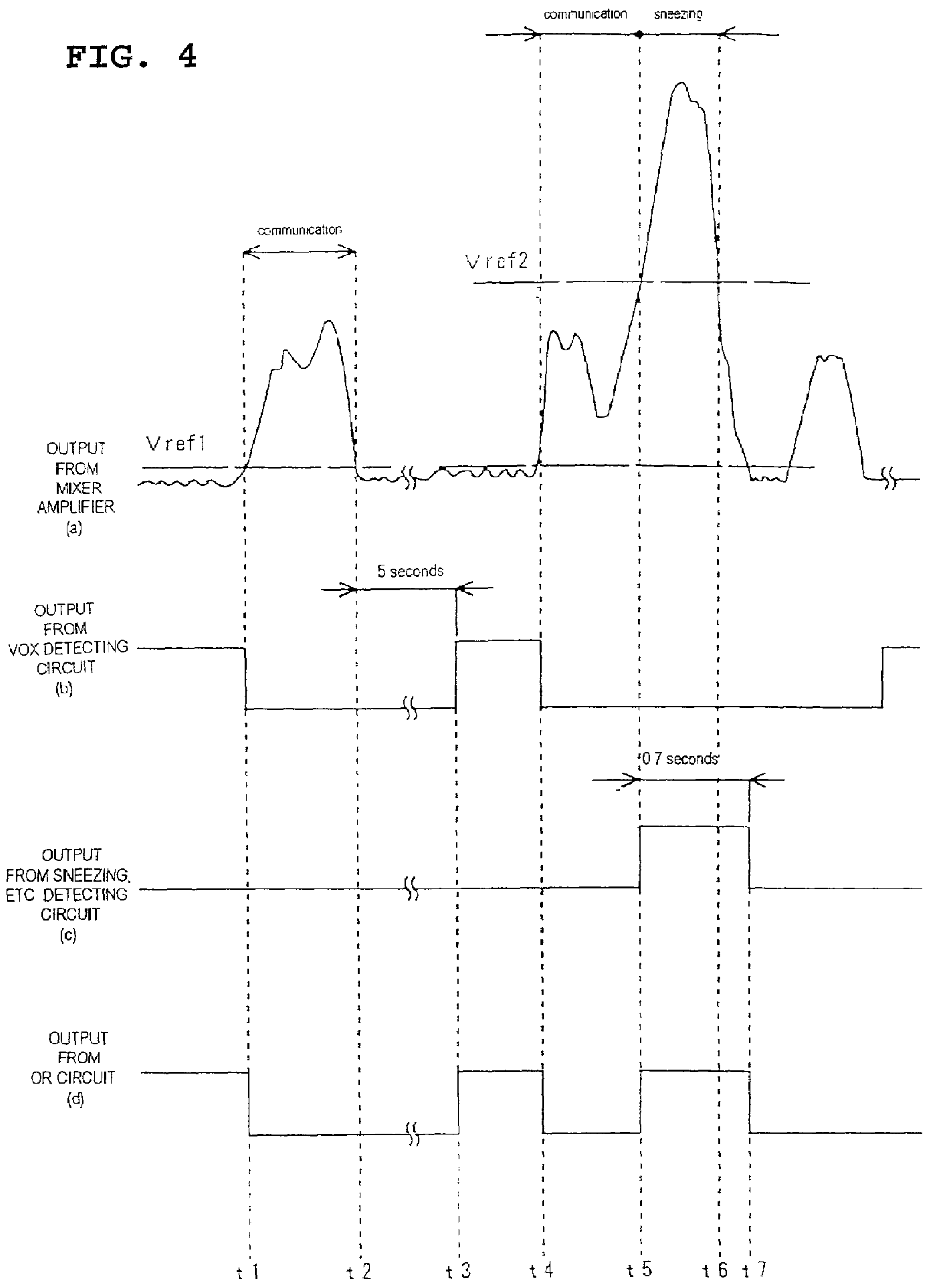
FIG. 4 is a drawing showing a signal waveform of the principal portion of the communication unit.

FIG. 4 is a drawing showing a signal waveform of the principal portion of the above-described communication unit 4. Since the acoustic signal supplied from the mixer amplifier 46 is below the reference value Vref1 until the time t1, the output of the VOX detecting circuit 44 is maintained at "H" level. As a consequent, the output of the OR circuit 49 is at the level "H" and each speaker amplifier 45*p*, 45*d* is muted. Accordingly, the power consumption of the speaker amplifiers 45*p*, 45*d* may be significantly saved.

Subsequently, when the communication between the occupants is started and the output from the mixer amplifier 46 increases and exceeds the reference value Vref1 at the time t1, the output from the VOX detecting circuit 44 is switched to the level "L". At this moment, the output of the sneezing, etc. detecting circuit 48 is still maintained at the level "L", and thus the output from the OR circuit 49 is also the level "L". As a consequent, each speaker amplifier 45*p*, 45*d* is released from the muted state, and thus an acoustic signal fed from each HPF 42, 43 is amplified at each speaker amplifier 45*p*, 45*d* and supplied from each speaker 12*p*, 12*d*.

Subsequently, when the communication is stopped at the time t2, and the output from the mixer amplifier 46 is decreased to the value below the reference value Vref1 and maintained at this value for 5 seconds, the output from the VOX detecting circuit 44 is switched to the level "H" at the time t3. As a consequent, the output from the OR circuit 49 is increased to the level "H", and each speaker amplifier 45*p*, 45*d* is muted again.

Then, when the communication is restarted and the output from the mixer amplifier 46 exceeds the reference value Vref1 at the time t4, the output from the VOX detecting circuit 44 is switched to the level "L". At this time, since the output from the sneezing, etc. detecting circuit 48 is still at the level "L", the output from the OR circuit 49 is also decreased to the level "L". As a consequent, each speaker amplifier 45*p*, 45*d* is released from the muted state, and thus an acoustic sound is supplied from each speaker 12*p*, 12*d*.

When one of the occupants sneezes during the communication and the output from the mixer amplifier 46 exceeds the reference value Vref2 at the time t5, the output from the sneezing, etc. detecting circuit 48 is switched to the level "H", and the delay circuit 48*b* actuates the 0.7 seconds timer. As a consequent, the output from the OR circuit 49 is increased to the level "H" only for 0.7 seconds and each speaker amplifier 45*p*, 45*d* is muted. Therefore, the speaker does not reproduce the sound of sneezing.

The physiological phenomenon such as sneezing or coughing finishes in a short time, and thus the output of the mixer amplifier 46 is already decreased to the value below the reference. value Vref2 at the time t6. Therefore, in this embodiment, at the time t7 when the 0.7 seconds timer of the delay circuit 48*b* is timed out. The physiological sound is considered to have attenuated completely, and thus the output from the sneezing, etc. detecting circuit 48 is returned to the level "L". On the other hand, when the communication continues for more than 5 seconds at the time period from the time t4 to the time t7, the output from the VOX detecting circuit 44 is maintained at the level "L", and thus the output from the OR circuit is decreased to the level "L" again where the communication is enabled.

According to this embodiment, sneezing or coughing is determined from the signal level, and when sneezing or coughing is detected, the mixer amplifier is muted for a prescribed time period (0.7 seconds in this embodiment). Therefore, reproducing of the physiological sound, such as sneezing or coughing from the speaker of the partner may be prevented with a very simple construction.

In the above-described embodiment, the muting time period by the sneezing, etc. detecting circuit 48 is set to 0.7 seconds. However, it is preferable that the muting time period is set to approximately five seconds in order to cope with continuous sneezing. Since sneezing or coughing stops within five seconds in many cases, the muting time period is preferably set to the range between 0.7 to 5 seconds.

Since the volume and duration of sneezing or coughing varies among individuals, in this embodiment, the operating switch 40 is provided for varying the reference value Vref2 or the setting time of the delay circuit 48*b*. Therefore, by adjusting the reference value Vref2 or the delay time according to the condition of the user, the communication being disturbed due to too long muting time period, or in contrast, the physiological sound cannot be shut down due to too short muting time period can be solved.

In the above-described embodiment, it is described that the sneezing, etc. detecting circuit 48 compares the input signal with the reference value Vref2, and determines the signal exceeding the reference value Vref2 as a signal corresponding to sneezing or coughing. However, the present invention is not limited thereto, and it is also possible to construct in such a manner that the sneezing, etc. detecting circuit 48 is constructed by a differentiating circuit for detecting the rate of change of the input signal. A sharp input signal such that the starting rate of change exceeds a prescribed reference rate of change is determined to be an input signal corresponding to sneezing and coughing.

Figure 5:
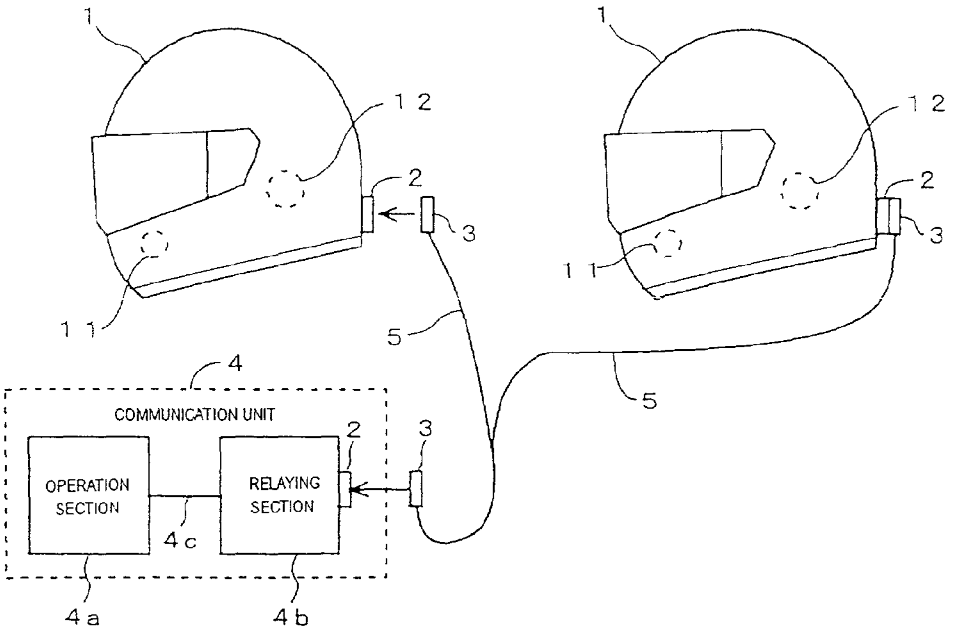
FIG. 5 is another block diagram of the communication system for vehicles to which the present invention is applied.
Figure 6:
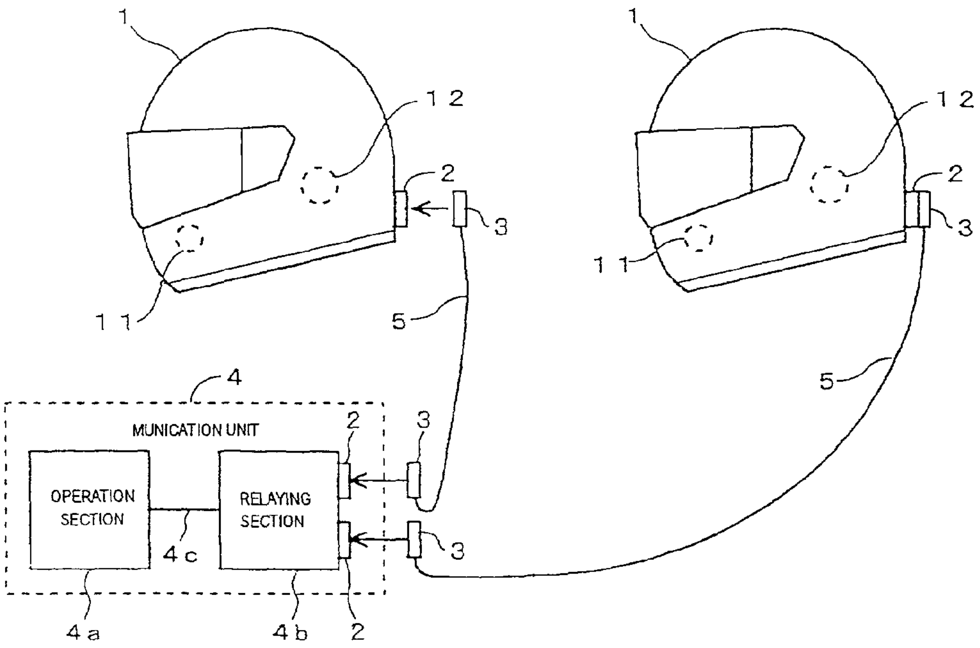
FIG. 6 is still another block diagram of the communication system for vehicles to which the present invention is applied.
Figure 7A:
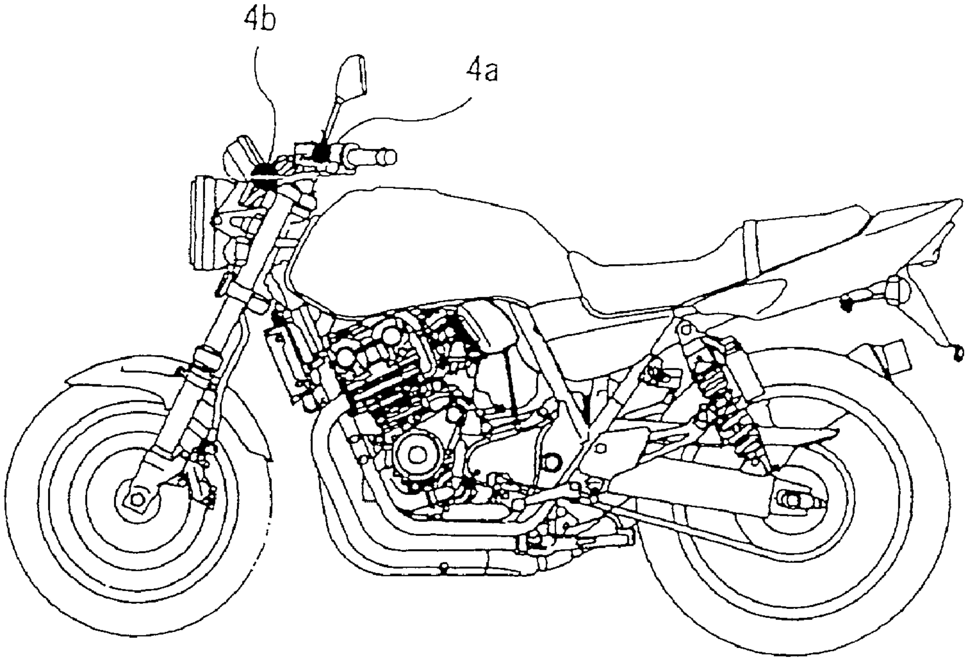
FIGS. 7(*a*) and 7(*b*) are drawings showing a layout of the communication unit on the vehicle.
Figure 7B:
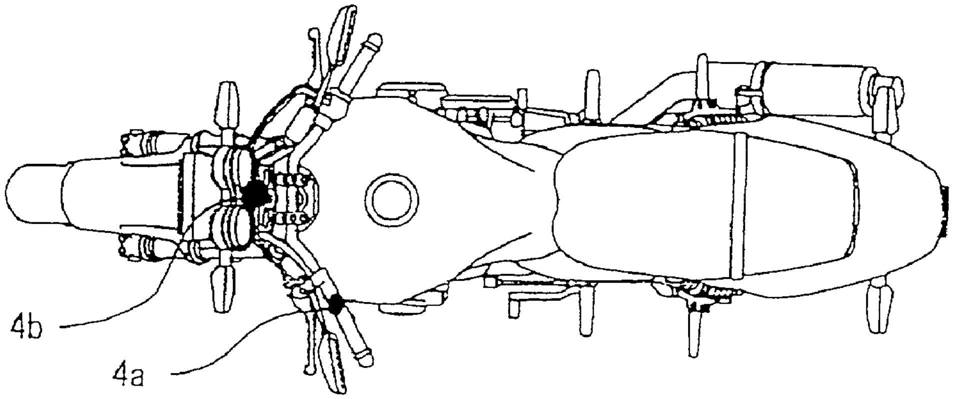

In the above-described embodiment, though it is described that the communication unit 4 is a mobile type that is detachable with respect to the vehicle body, it may be the fixed type that can be fixed on the vehicle. When the communication unit 4 is fixed on the vehicle, it is preferable to fix it in the vicinity of the handle grip in order to provide a good operability. However, since the position in the vicinity of the handle grip is displaced to a large extent when steering the handle, the connecting cable 5 may disturb steering of the handle. Therefore, in order to modify the communication unit 4 to a vehicle fixing type, as shown in FIG. 5 and FIG. 6, preferably, the communication unit 4 is divided into the final controlling element 4*a*, including the operating switch 40 and the relay section 4*b*, whereby both are connected by a junction cable 4*c*, and as shown in FIG. 7(*a*) and FIG. 7(*b*). The final controlling element 4*a* is disposed in the vicinity of the handle grip. The relay section 4*b* is fixed for example at the center of the handle where displacement during steering of the handle is small.

Figure 8:
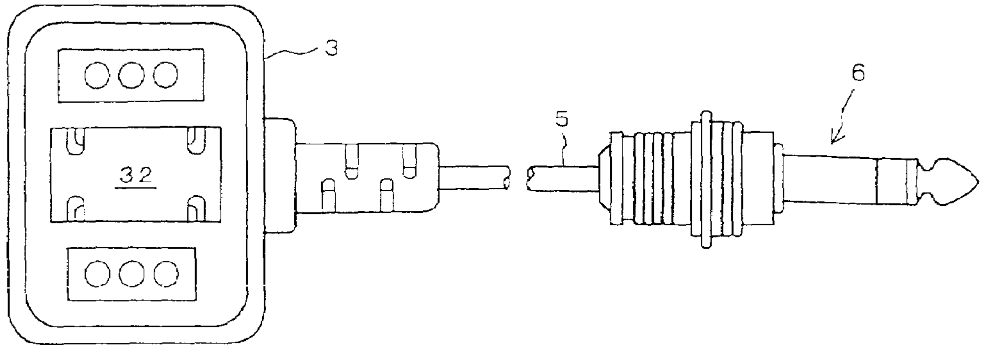
FIG. 8 is a drawing showing an embodiment (1) of the connecting cable for connecting the communication unit and the helmet.

When modifying the communication unit 4 to a fixed type, it is required that the cable 5 can be detached from the communication unit 4 as shown in FIG. 5 and FIG. 6. In this case as well, considering the possibility that the cable 5 is stored in the pocket or in the bag, as shown in FIG. 8, the cable 5 may be provided with a magnetic-body-side socket 3 at the end to be connected to the helmet and with a plug 6 at the end to be connected to the communication unit 4, so that the plug 6 is inserted into a jack (not shown) provided on the communication unit 4 to connect both of them.

However, the occupant of the motorcycle wears gloves in many cases, and thus it is preferable that connection between the communication unit 4 and the cable 5 can be performed with the groves worn. However, connection between the above-described plug 6 and a jack is difficult in a state of wearing gloves since the plug 6 have to be inserted into a small bore on the jack.

In addition, in the case of connection between the plug 6 and the jack, when a load to separate the communication unit 4 is fixed on the vehicle and the cable 5 is applied between them, and when the direction of a load is deviated from the direction of insertion of the plug 6, a large load may be applied to the plug 6 or the jack upon separation.

Figure 9:
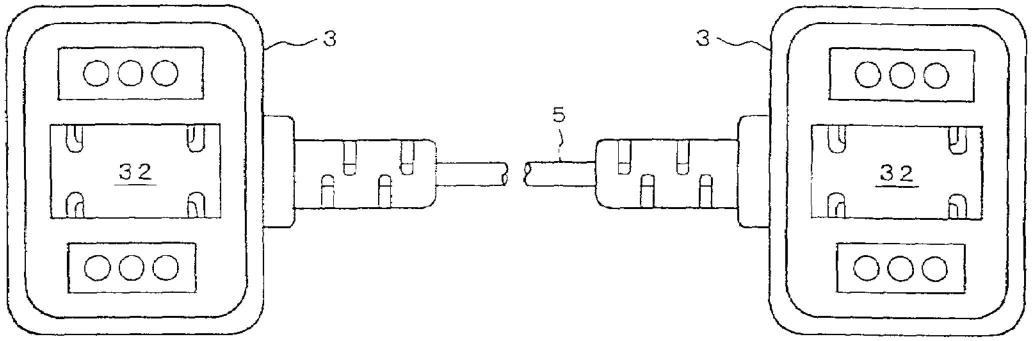
FIG. 9 is a drawing showing an embodiment (2) of the connecting cable for connecting the communication unit and the helmet.

In order to solve such problems, as shown in FIG. 9, a magnetic-body-side socket 3 may be provided on the cable 5 on the side of the communication unit 4 as well as on the side of the helmet, and connected to the magnet-side socket 2 provided on the communication unit 4. In this arrangement, there is not a magnet-side socket 2 as a source of magnetic field lines on the cable 5, and thus exertion of magnetically damaging effect on other contents, such as a magnetic card or the like can be prevented, even when it is stored in the pocket or in the bag together with the magnetic card or the like.

Figure 10:
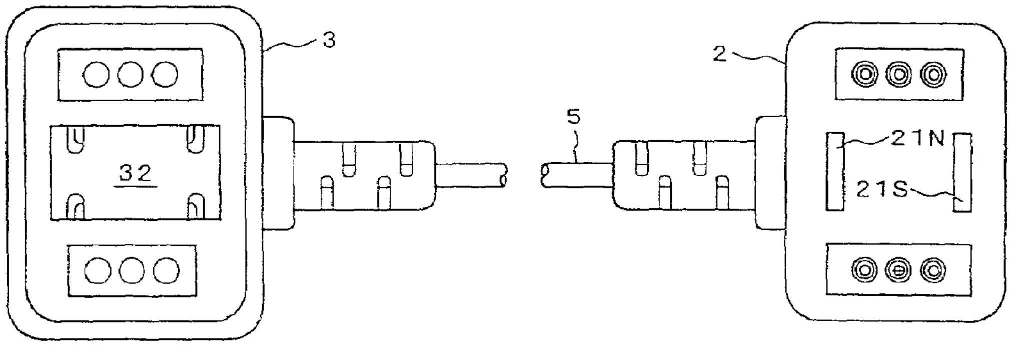
FIG. 10 is a drawing showing an embodiment (3) of the connecting cable for connecting the communication unit and the helmet.

In addition, when it is constructed in such a manner that each helmet 1 and the communication unit 4 are connected independently with two cables 5, as shown in FIG. 6, the magnet-side socket 2 and the magnetic-body-side socket 3 may be provided on each end of the cable 5, as shown in FIG. 10, so that the magnet-side-socket 2 is connected to the magnetic-body-side socket 3 provided on the communication unit 4.

Figure 11:
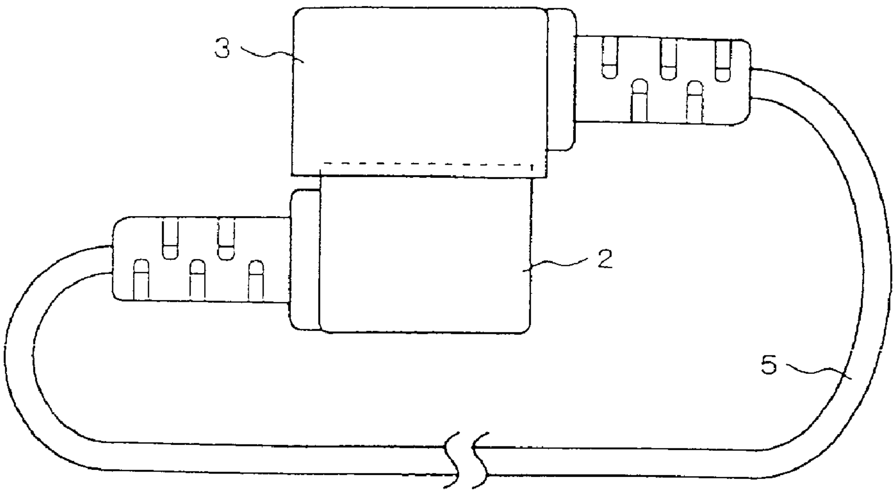
FIG. 11 is a drawing showing how to store the connecting cable shown in FIG. 9.

In this arrangement, when carrying the cable 5, by connecting the magnet-side socket 2 and the magnetic-body-side socket 3 provided on each end of the cable 5 as shown in FIG. 11, a magnetic force generated from the magnet-side socket 2 forms a closed magnetic path in the magnet connector, and thus the magnetic field lines do not leak out. Therefore, even when the cable 5 is stored together with the magnetic card, exertion of magnetically damaging effect on the magnetic card can be reduced.

Figure 12:
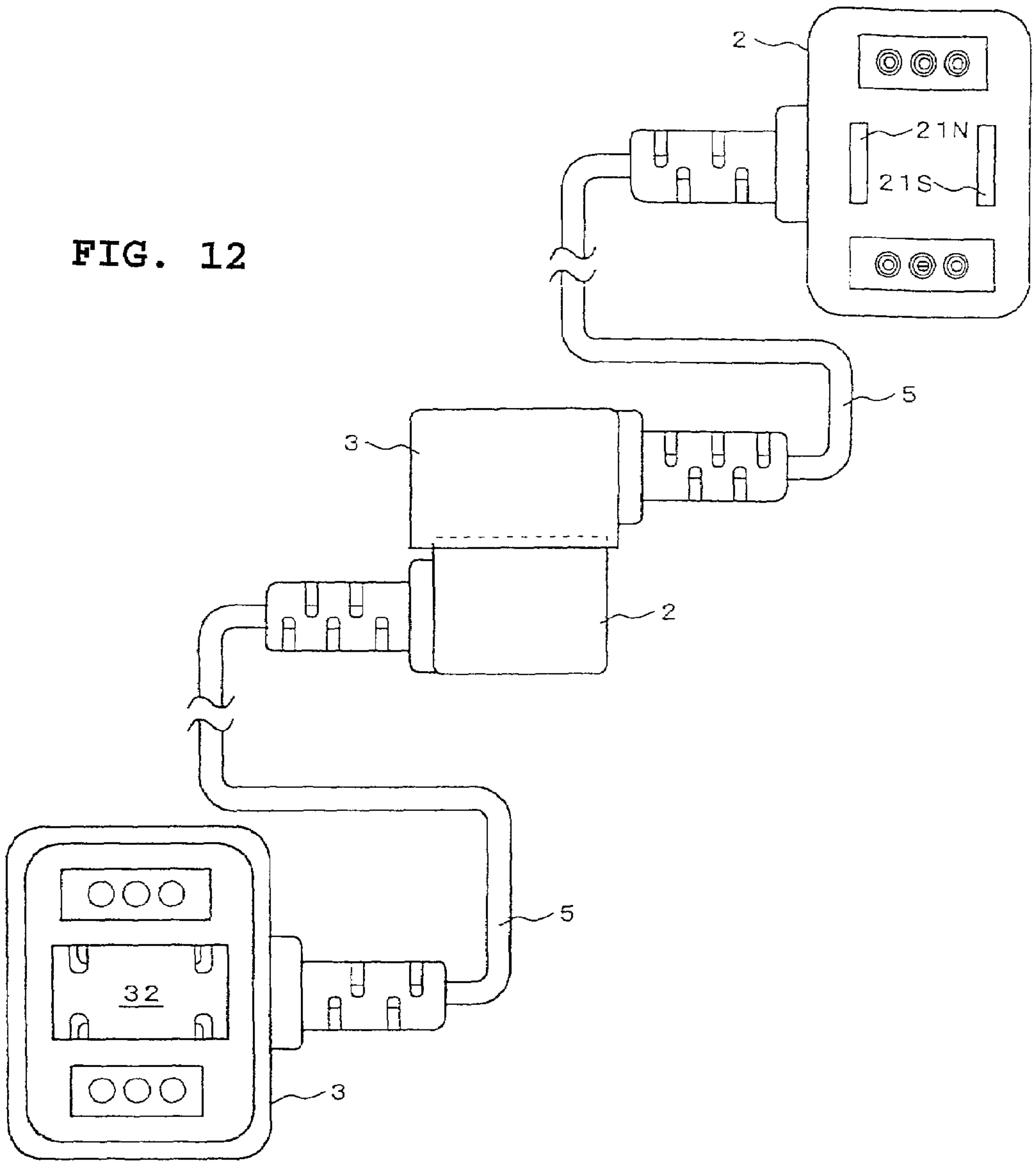
FIG. 12 is a drawing showing how to extend the connecting cable shown in FIG. 9.

In addition, when the magnet-side socket 2 and the magnetic-body-side socket 3 are provided on each end of the cable 5 as described above, a plurality of cables 5 may be connected in series as shown in FIG. 12, and thus the cable can easily be extended.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A communication system for a helmet comprising:
- a magnet-side socket mounted on the helmet;
- a magnet-body-side socket for detachably connecting to the magnet-side socket;
- a connecting cable extending from the magnet-body-side socket; and
- a communication unit connected to the magnet-body-side socket for communicating voices in which a relatively large physiological sound is not transmitted,
- wherein a connecting surface of the magnetic-body-side socket is formed with an annular rib standing upward along a periphery of the magnetic-body-side socket and
- wherein the magnet-side-body socket further comprises a connecting surface, the connecting surface having plurality of electrodes.

2. The communication system according to claim 1, wherein the magnet-side socket further comprises a connecting surface, the connecting surface of the magnet-side-body socket having a plurality of electrodes connected to the plurality of electrodes on the magnet-side socket.

3. The communication system according to claim 2, wherein the connecting surface of the magnet-side socket further comprises a South pole iron strip and a North pole iron strip.

4. The communication system according to claim 1, the communication unit further comprises a microphone amplifier for amplifying and outputting an audio signal detected by a microphone mounted on the helmet.

5. The communication system according to claim 4, wherein the audio signal from the microphone amplifier passes through a highpass filter to remove or attenuate components of lower frequency therein.

6. The communication system according to claim 4, wherein the microphone amplifier is provided with a mute terminal, the mute terminal attenuates or shuts down the audio signal when a control signal level is reached.

7. The communication system according to claim 4, wherein the microphone amplifier is provided with a mixer for synthesizing and amplifying the audio signal.

8. The communication system according to claim 7, wherein the mixer outputs the audio signal to a VOX detecting circuit, the VOX detecting circuit having a level detecting circuit and a delay circuit.

9. The communication system according to claim 8, wherein the level detecting circuit provides a signal with a first reference valve, the first reference valve being set to a value close to a minimum value of an acoustic communication signal.

10. The communication system according to claim 9, wherein the acoustic communication signal exceeds the first reference valve for providing communication voices.

11. The communication system according to claim 9, wherein the acoustic communication signal falls below the first reference valve such that no communication voices are heard.

12. The communication system according to claim 8, wherein the delay circuit provides a five second delay.

13. The communication system according to claim 7, further comprising a second detecting circuit for detecting sneezing or coughing, the second detecting circuit having a level detecting circuit and a delay circuit.

14. The communication system according to claim 13, wherein the level detecting circuit in the second detecting circuit provides a signal with a second reference valve, the second reference valve being set to a value close to a minimum value of a signal level generated by the physiological sound.

15. The communication system according to claim 14, wherein the detecting level circuit in the second detecting circuit provides an output signal for 0.7 seconds when the signal is higher than the second reference valve.

16. The communication system according to claim 1, wherein the communication unit further comprises an operating switch for varying a reference value, a delay time for a delay circuit and a gain of a speaker amplifier.

17. The communication system according to claim 1, wherein the communication unit is detachable fixed to a vehicle.

18. The communication system according to claim 1, wherein the communication unit is transportable.

19. A communication system for a helmet comprising:
- a magnet-side socket mounted on the helmet;
- a magnet-body-side socket for detachably connecting to the magnet-side socket;
- a connecting cable extending from the magnet-body-side socket; and
- a communication unit connected to the magnet-body-side socket for communicating voices in which a relatively large physiological sound is not transmitted,
- wherein the communication unit further comprises an OR circuit for switching an output signal from a VOX circuit and an output signal from a second detecting circuit.

20. A communication system for a helmet comprising:
- a magnet-side socket mounted on the helmet;
- a magnet-body-side socket for detachably connecting to the magnet-side socket;
- a connecting cable extending from the magnet-body-side socket; and
- a communication unit connected to the magnet-body-side socket for communicating voices in which a relatively large physiological sound is not transmitted,
- the communication unit including:
  - a microphone amplifier for amplifying and outputting an audio signal detected by a microphone mounted on the helmet, the microphone amplifier including a mixer for synthesizing and amplifying the audio signal, and
  - a second detecting circuit for detecting sneezing or coughing, the second detecting circuit having a level detecting circuit and a delay circuit.

* * * * *